United States Patent [19]

Lazarus

[11] Patent Number: 4,739,330
[45] Date of Patent: Apr. 19, 1988

[54] FREQUENCY MODULATION RADIO ALTIMETER

[75] Inventor: Michel Lazarus, Gif sur Yvette, France

[73] Assignee: Thomson-CSF, Paris, France

[21] Appl. No.: 746,328

[22] Filed: Jun. 19, 1985

[30] Foreign Application Priority Data

Jun. 29, 1984 [FR]   France ................................. 84 10350

[51] Int. Cl.$^4$ ............................................. G01S 13/34
[52] U.S. Cl. .................................... 342/122; 342/128; 342/85
[58] Field of Search ................ 343/12 A, 14; 342/120, 342/122, 123, 128, 129, 130, 74, 85, 86, 87

[56] References Cited

U.S. PATENT DOCUMENTS

| | | | |
|---|---|---|---|
| 2,726,383 | 12/1955 | Dunn | 342/85 |
| 2,825,056 | 2/1958 | Rust | 342/85 |
| 3,860,925 | 1/1975 | Darboven, Jr. | 343/12 A |
| 4,069,482 | 1/1978 | Parker et al. | 343/12 MD X |
| 4,126,861 | 11/1978 | Witte et al. | 342/16 |
| 4,241,346 | 12/1980 | Watson | 342/74 |
| 4,276,549 | 6/1981 | Tomasi | 342/87 |
| 4,291,309 | 9/1981 | Spiller et al. | 342/82 |
| 4,367,473 | 1/1983 | Marin et al. | 342/87 |
| 4,503,433 | 3/1985 | Tomasi | 342/87 |
| 4,567,484 | 1/1986 | Schilz et al. | 342/128 |
| 4,620,192 | 10/1986 | Collins | 342/128 |

*Primary Examiner*—Thomas H. Tarcza
*Assistant Examiner*—John B. Sotomayor

[57] ABSTRACT

A frequency modulation radio altimeter has a directional antenna which is connected to a transmission-reception switch controlled by a signal generator. The generator delivers periodic signals whose recurrence period is proportional to the delay time of the ground echo. The transmitter includes a radio frequency modulator modulated in frequency by a saw tooth signal whose recurrence period is proportional to the delay time of the ground echo. A homodyne receiver includes circuits for acquiring and tracking the ground echo signal, and supplies an output signal representative of the altitude and a control signal which is supplied to the inputs controlling the recurrence period of the transmission modulator and of the generator controlling the transmission-reception switch.

10 Claims, 7 Drawing Sheets

FIG_4

FIG_5

FIG_6

FIG_10

FIG_11

FREQUENCY MODULATION RADIO ALTIMETER

BACKGROUND OF THE INVENTION

1. Field of the Invention

The invention relates to a radio altimeter with frequency modulation and more especially to a radio altimeter in which the transmitter and receiver share a common antenna.

2. Description of the Prior Art

Frequency modulated, continuous wave radio altimeters or FM/CW radio altimeters, are widely known.

The basic principles of continuous wave radars are set forth in the corresponding technical literature and more especially in the work by M. I. SKOLNIK entitled "Radar Handbook" chapter 16, edited in 1970 by McGraw-Hill. The main advantages of FM/CW radars reside in their relative simplicity of construction and in their ability to provide a precise measurement of the relative distance from a reflecting object situated inside their detection range. On the other hand, the FM/CW radars of the prior art have constructional restrictions and technical limitations which result from the need to use two separate antennae: a transmitting antenna and a reception antenna, generally, having identical electrical and mechanical characteristics. In fact, in order to provide sufficient radioelectric decoupling, the spacing between the two antennae must be large so as to eliminate the electromagnetic interferences between transmitter and receiver. There then arise certain radioelectric and mechanical problems due more especially to the fact that the antennae cannot be physically integrated in the equipment but must be fixed to the structure of the carrier vehicle and interconnected with the equipment through transmission lines whose transmission delay must be calibrated. In addition, these transmission lines introduce propagation losses and multiple reflections, which adversely affect the performance of the equipment. When the relative distance from the object to be detected is reduced, and when this object is of large size, a phenomenon of multiple paths may appear. The effect of this multipath phenomenon is to provide erroneous distance measurements. The geometry of the path of the signals radiated and picked up by the antennae is not perfect, and thus measurement errors may result when the altitude of the carrier is of the order of a meter. On the other hand, if we consider the mechanical problems raised by implantation of the two antennae on the structure of the carrier vehicle, the following should be mentioned: the need to reserve, inside the vehicle, housings for the antennae, passages for the radio frequency transmission lines and accesses to the connectors for mounting and removing the radio altimeter. Finally, the electric continuity of the wall of the carrier vehicle must be preserved, which involves limitations in the construction of this wall.

An FM/CW radio altimeter has already been proposed in which the transmitter and receiver operate continuously while using a common antenna. In this radio altimeter the local signal of the radio frequency mixer of the receiver is obtained by reflection of the signal transmitted by the T.O.S. (Standing Wave Rate) of the antenna. The construction of the equipment is thus appreciably simplified, but to the detriment of the minimum altitude measurable, which may reach 6 to 10 meters, depending on the maximum operating altitude of the radio altimeter.

SUMMARY OF THE INVENTION

The aim of the invention is to provide a frequency modulation radio altimeter with a single antenna capable of operating over a large altitude range.

To attain this end, the transmitter and the receiver of the radio altimeter operate cyclically in an interlaced operating mode such that the echo signal from the ground is not "eclipsed" by the transmission signal.

This radio altimeter comprises: a transmission-reception (E/R) switch connected to a directional antenna, this switch having a control input connected to a periodic signal generator whose recurrence period is proportional to the delay time of the echo signal; a transmitter connected to the input signal of the E/R switch and including a saw tooth signal modulator whose recurrence period is proportional to the delay time of the echo signal, and a homodyne receiver including an audio frequency band pass amplifier and circuits for acquiring and tracking the echo signal which deliver a measurement signal representative of the altitude above the ground, and a control signal which is supplied to the transmission modulator and to the generator of signals controlling the E/R switch so as to vary respectively the recurrence periods of the signals delivered by these elements.

BRIEF DESCRIPTION OF THE DRAWINGS

The invention will be better understood from the detailed description which follows, with reference to the accompanying drawings in which.

DESCRIPTION OF THE PREFERRED EMBODIMENTS

Figure 1:
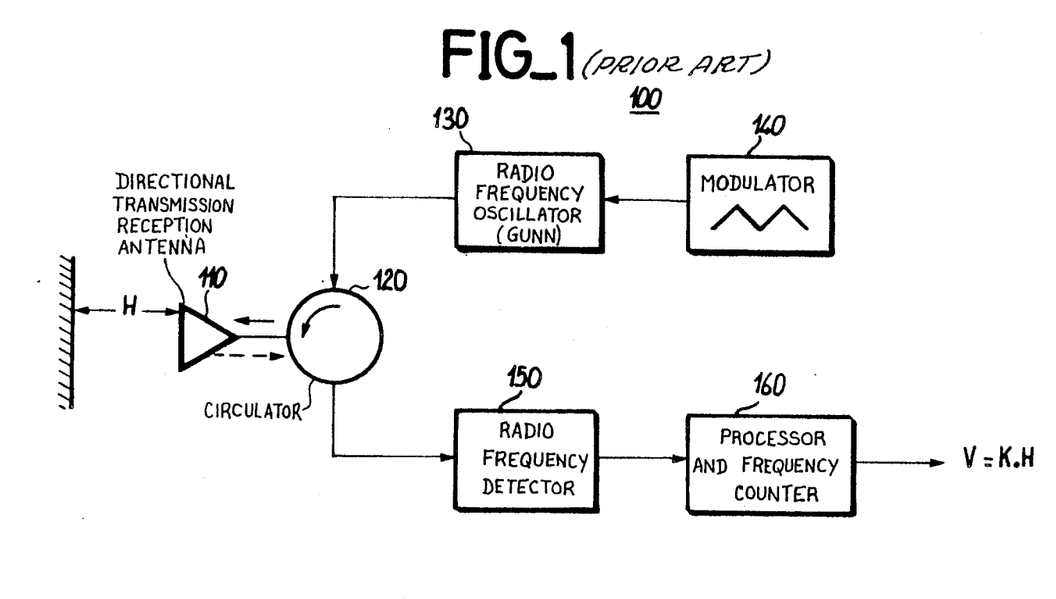
FIG. 1 is a simplified block diagram showing a single antenna radio altimeter of the prior art.

FIG. 1 is a simplified block diagram showing a single antenna radio altimeter 100 of the prior art.

A directional transmission-reception antenna 110 is connected to a circulator 120 having an input connected to an FM/CW transmitter and an output connected to a homodyne receiver. The transmitter is formed by a GUNN oscillator 170 tunable in frequency by means of a varactor element. The transmission frequency is varied linearly by means of a triangular signal, of a fixed recurrence period, provided by a modulator 140. The receiver comprises a radio frequency detector 150 in which the local wave is obtained by a fraction of the transmission signal reflected by the T.O.S. (standing wave rate) of the antenna. The output signal of the radio frequency detector is applied to a processor 160 which includes a counter counting the beat frequency between the local wave and the echo signal reflected by the ground. This frequency counter delivers a DC output signal Vs whose size is proportional to the altitude H above the ground.

Figure 2:
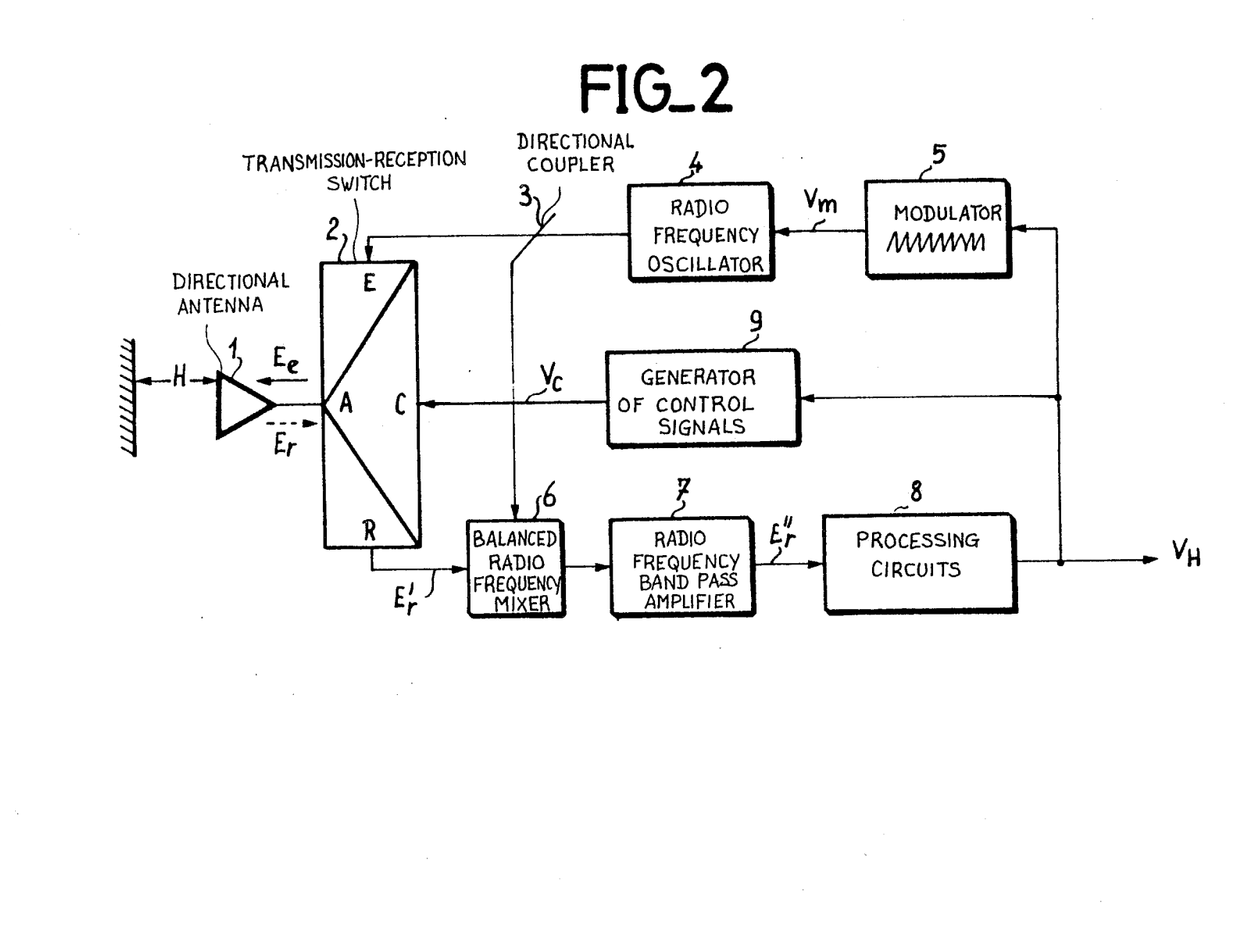
FIG. 2 is a block diagram showing the basic structure of the radio altimeter of the invention.

FIG. 2 is a block diagram which shows the basic structure of the radio altimeter according to the present invention. A directional aerial 1 is connected to a transmission-reception switch 2 which allows the transmission signal Ee to be radiated cyclically and the signal Er reflected from the ground to be picked up. The transmission-reception switch (E/R) comprises: an input access (E), an output access (R) and a control input (C). The transmitter of the radio altimeter is connected to the input access (E) of this E/R switch and it comprises, connected in series: a directional coupler 3, a radio frequency oscillator 4 and a modulator 5. The radio frequency oscillator operates with a carrier frequency Fc and it comprises electronic means for linearly modulating the carrier frequency with a constant maximum frequency deviation of $\Delta$fm. The modulator 5 delivers periodic saw tooth signals and it comprises electronic means for varying the period Tm of the saw tooth signals proportionally to the delay time $\tau$ of the echo signal reflected by the ground and picked up by the antenna. The receiver of the radio altimeter is of the homodyne type and it is connected to the output axis (R) of the E/R switch. This receiver comprises, connected in series: a balanced radio frequency mixer 6 having its reference input connected to the directional coupler 3 of the transmitter; an audio frequency band pass amplifier 7 and circuits 8 for acquiring and tracking the altitude echo signal picked up by the antenna. These acquisition and tracking circuits deliver a measurement signal $V_H$ representative of the delay time of the echo signal, which is proportional to the altitude above the ground. The means for controlling the E/R switch is provided by a generator of periodic signals whose recurrence frequency $T_R$ is proportional to the delay time $\tau$ of the echo signal. Finally, the circuits for acquiring and tracking the echo signal supply a control signal $V_R$ which is applied, on the one hand, to the transmission modulator 5 and, on the other, to the generator 9 of signals controlling the E/R switch.

Figure 3:
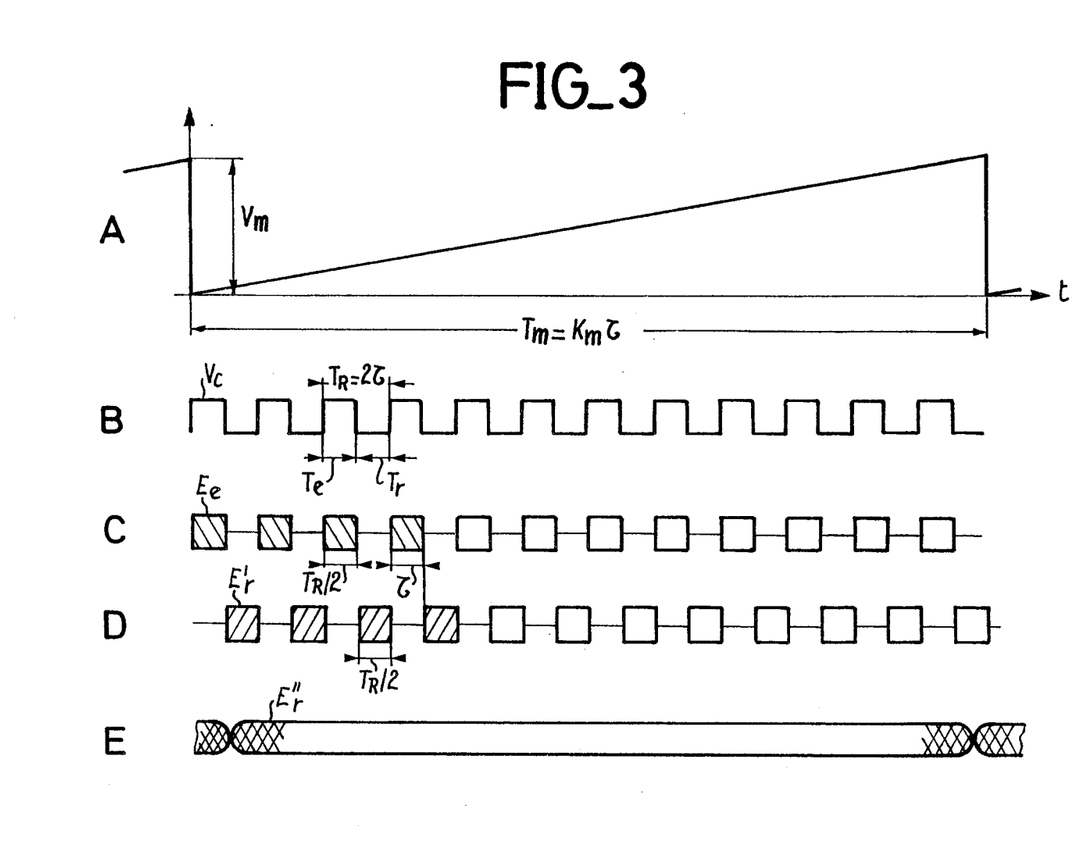
FIG. 3 is a timing diagram of the main signals elaborated by the elements of the radio altimeter.

FIG. 3 shows a timing diagram of the main signals of the radio altimeter. Curve (A) shows the wave form of the modulation signals Vm(t) supplied by the modulator 5. These saw tooth modulation signals have a recurrence frequency Tm given by the following relationship:

$$Tm = Km.\tau$$

with $\tau$ the delay time of the echo signal, and the amplitude of these modulation signals is constant. The frequency deviation $\Delta$fm(t) of the carrier frequency Fc of the radio frequency oscillator 4 is given by the relationship:

$$\Delta fm(t) = Kv.Vm(t)$$

Curve (B) shows the wave form of the signal Vc controlling the E/R switch and supplied by the signal generator 9. This control signal Vc whose times Tr and Te are substantially equal to a recurrence period $T_R$ given by the following relationship:

$$T_R = (Te + Tr) = 2\tau$$

where $\tau$, the travelling time of the echo signal, is given by the relationship:

$$\tau = 2H/c$$

with: H the altitude above the ground and c the speed of propagation of the electromagnetic waves.

It will be assumed that when the signal Vc is at the high level the E/R switch is in the transmission position and, conversely, when the signal Vc is at the low level, the E/R switch is in the reception position.

Curve (C) shows the wave form of the signals Ee radiated by the antenna 1; the duration of these signals Ee is equal to $T_R/2 = \tau$ and the carrier frequency Fc varies linearly as a function of time.

Curve (D) shows a wave form of the radio frequency signals E'r at the output access R of the E/R switch. The power Pr of these signals E'r is given by the following relationship:

$$Pr = \frac{Pe \cdot G \cdot \lambda^2 c \cdot \sigma o}{(4\pi)^2 \cdot H^2}$$

where
  Pe = the power of the output signal of the radio frequency oscillator of the transmitter,
  G = the gain of the antenna,
  $\lambda$C = the wave length corresponding to the transmission carrier frequency Fc,
  $\sigma$o = the reflectivity coefficient of the ground
  H = the altitude above the ground.

Curve (E) shows the wave form of the signal E"r at the output of the audio frequency band pass amplifier. The frequency of these signals E"r is equal to the beat frequency $f_b$ given by the following relationship:

$$f_b = \frac{\Delta Fm}{Tm} \cdot \tau = \frac{\Delta Fm}{Km} = C^{te}$$

The spectrum of these signals E'r is a line spectrum whose strongest line is at the beat frequency fb. The pass band of the audio frequency amplifier 7 is centered at this bear frequency and its upper cut-off frequency fcH is such that:

$$fb < fcH < Fr - fb$$

The result is that, at the output of the audio frequency amplifier, the signal E"r is continuous for the period of time Tm.

The ratio of the recurrence period Tm of the modulation signal to the switching period $T_R$ of the E/R switch is constant and it is equal to Km/2.

The altitude H and the magnitudes of the parameters $\Delta$fm, Tm and fb of the radio altimeter are related by the relationship:

$$H = \frac{C \cdot f_b}{2\Delta Fm} \cdot Tm$$

When the altitude H decreases, the period Tm of the frequency modulation saw teeth of the transmitter decreases proportionally. It follows that the minimum altitude Hmin measured by the radio altimeter is substantially equal to:

$$Hmin = \frac{C}{2\Delta Fm}$$

with the condition: $f_b \cdot Tm = 1$.

By way of illustration, if the frequency variation Fm of the transmitter is equal to 100 MHz Hmin=1.5 meters to which corresponds a delay time $\tau = 10^{-2}$ μs. The recurrence frequency $$F_R = \frac{1}{T_R} = \frac{1}{2\tau}$$

is then equal to 50 MHz.

When the altitude H increases, the period Tm of the saw tooth signals increases and the recurrence frequency $F_R$ of the signals controlling the E/R switch decreases. The result is that the sampling frequency of the beat signal, of a fixed frequency $f_b$, must remain less than FR/2, which imposes an upper limit on the measurement of the maximum altitude Hmax measured by the radio altimeter. This altitude Hmax is given by the following relationship:

$$Hmax = \frac{C \cdot TR}{4} = FR/2 = \frac{C}{8 f_b}$$

By way of illustration, if $f_b = 20$ KHz, Hmax=1875 meters. However it should be noted that this limit in measuring the maximum altitude may be extended, if the general "anti-eclipse" condition is considered:

$$T_R = \frac{2\tau}{(2K + 1)}$$

with K an integer including the value zero.

Thus the maximum altitude Hmax is given by the general formula:

$$Hmax = \frac{C}{8 f_b} \cdot (2K + 1)$$

Finally, it may also be noted in the preceding relationship Tm=Km τ, that the factor of proportionality Km may be a fractional number.

Referring again to FIG. 2, the constructional characteristics described hereafter may be seen. The T.O.S. of the directional antenna 1 is not a critical parameter since the level of the transmission signal reflected by the antenna towards the receiver is blocked by the E/R switch. Thus, the antenna may be formed by a radiating slits source formed in accordance with the printed circuit technique. The radio frequency oscillator 4 may be formed by a GUNN element coupled to a varactor element. The radio frequency mixer 6 of the receiver is of the balanced type so as to limit the parasite noise signals resulting from the amplitude fluctuations of the transmission oscillator. It is always preferable to equalize the electric lengths between directional coupler 3 and the balanced mixer 6, on the one hand and between the directional coupler and the signal input of the balanced mixer, via the antenna, on the other. The band pass amplifier 7 must efficiently reject the frequency of the saw tooth modulation signals and transmit the beat signal E''r whose duration is equal to the period Tm of the saw tooth modulation signals. The acquisition and tracking circuits operate in two operating modes: a first mode during which the value of the signal $V_H$ is varied between the minimum and maximum limits so as to detect the presence of an echo signal in the pass band of the band pass amplifier and a second mode during which the frequency difference between the frequency of the echo signal and the nominal beat frequency $f_b$ is measured and integrated so as to provide the measurement signal $V_H$.

Figure 4:
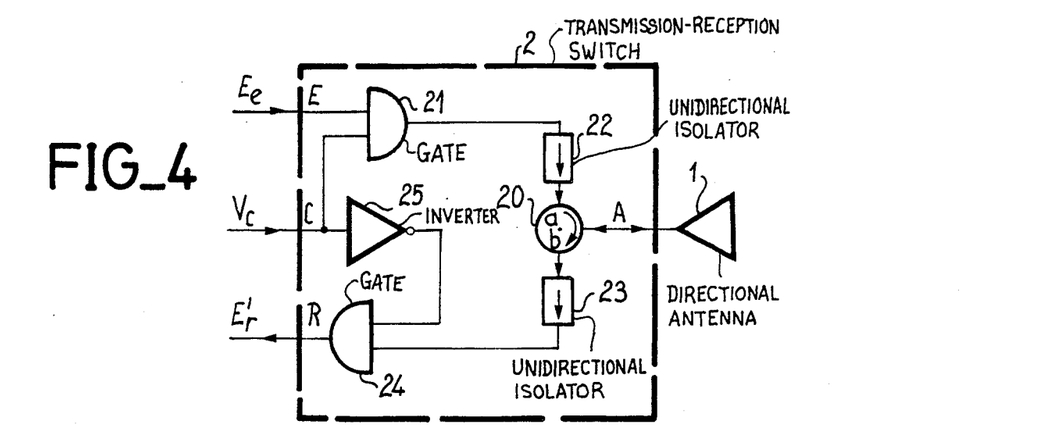
FIG. 4 is a circuit diagram showing one embodiment of the E/R switch.

FIG. 4 is a block diagram which shows one embodiment of the antenna switch. The antenna switch 2 comprises a signal input (E), a signal output (R) and a signal input/output (A), which is connected to a circulator (20) having an input (a) and an output (b). The input channel of the switch comprises, connected in series: a first gate 21 and a unidirectional isolator 22 which is connected to the input (a) of the circulating device 20. The output channel of the antenna switch which is connected to the output (b) of the circulating device comprises, connected in series: a unidirectional isolator 23 and a second gate 24. The control inputs of the first and second gates are connected to the control signal Vc, by a direct connection for the first gate and by the inverter element 26 for the second gate. The function of the first gate is to chop the continuous radio frequency signal supplied by the oscillator of the transmitter. The function of the second gate combined with the isolator is to isolate the receiver during the transmission intervals. In a preferred embodiment, the input impedance of each of the two signal inputs of the antenna switch is kept constant in the two switching states.

Figure 5:
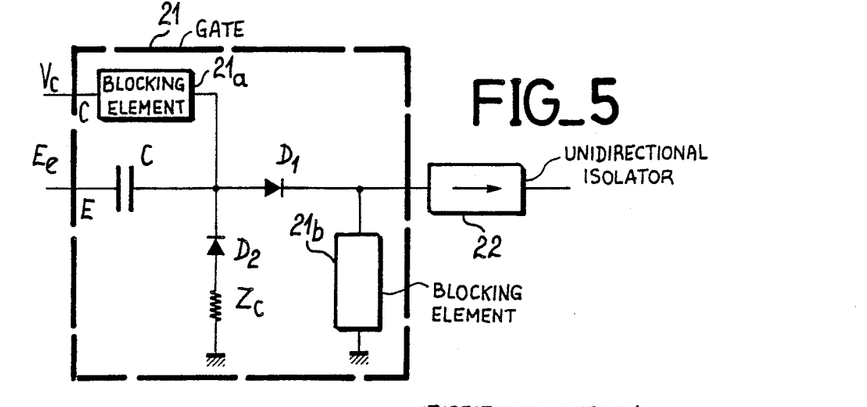
FIG. 5 is a circuit diagram showing one embodiment of a gate circuit of the E/R switch.

FIG. 5 is a block diagram which shows one form of construction of a gate, such as the first gate 21 of the E/R switch shown in FIG. 4. This gate comprises a signal input E and a control input C. The connection between the signal input E and the unidirectional isolator 22 comprises an isolating capacitor C and a diode D1. At the junction point between capacitor C and diode D1 are connected, on the one hand, a diode D2 in series with an impedance Zc whose value is equal to the input impedance of the antenna and, on the other hand, a first element 21a for blocking the radio frequency signal Ee, this blocking element being connected to the source of control signals Vc. A second blocking element 21b is connected to the junction point between diode D1 and the unidirectional isolator 22.

The configuration of the second gate 24 may be identical to that of the first gate 21.

Figure 6:
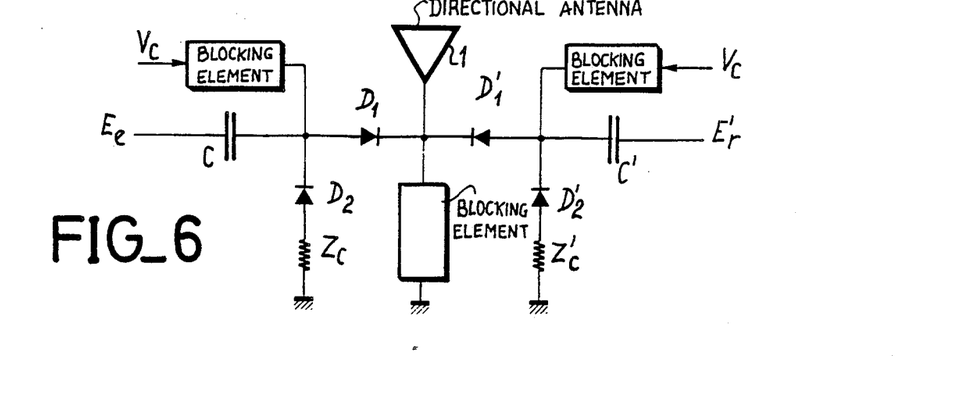
FIG. 6 is a circuit diagram of a variant of the E/R switch.

FIG. 6 is a block diagram which shows one embodiment of the E/R switch in which the circulator and the unidirectional isolators have been eliminated. In fact, when the switching rate of diodes D1 and D'1 is high, the transmitter and the receiver may be cyclically isolated from the antenna 1.

The E/R switch may be constructed in integrated form and uses FET-AsGa switching elements as described in the article by Y. AYASLI "Microwave Switching with GaAs FETs" published in the review "Microwave Journal", November 1982, page 60. Such a switch may reach switching speeds less than a nanosecond and switch radio frequency signals of a level of several watts.

Figure 7:
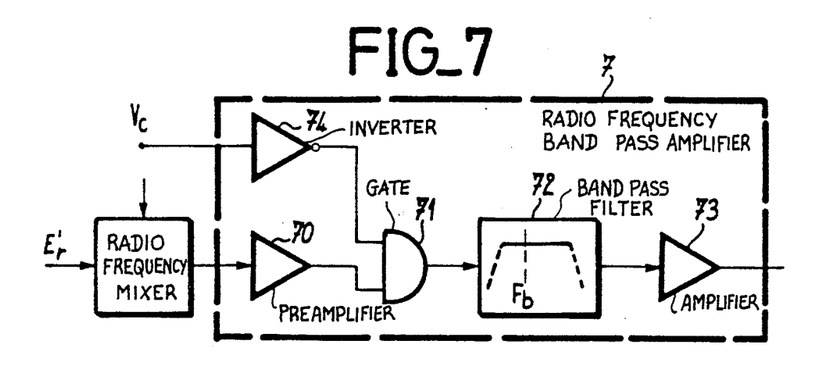
FIG. 7 is a block diagram showing one embodiment of the audio frequency band pass amplifier of the receiver.

FIG. 7 shows a variant of the band pass radio frequency amplifier 7 of the receiver. In this variant, this band pass amplifier comprises a low noise preamplifier 70, a gate circuit 71, a band pass filter 72 and an output amplifier 73. The control input of the gate circuit is connected to the source of signals Vc controlling the E/R switch through an inverter element 74. The function of the gate circuit 71 is to increase the isolation between the emitter and the receiver during the transmission periods Te and to reduce the level of the noise signals of the receiver.

Figures 8, 9:
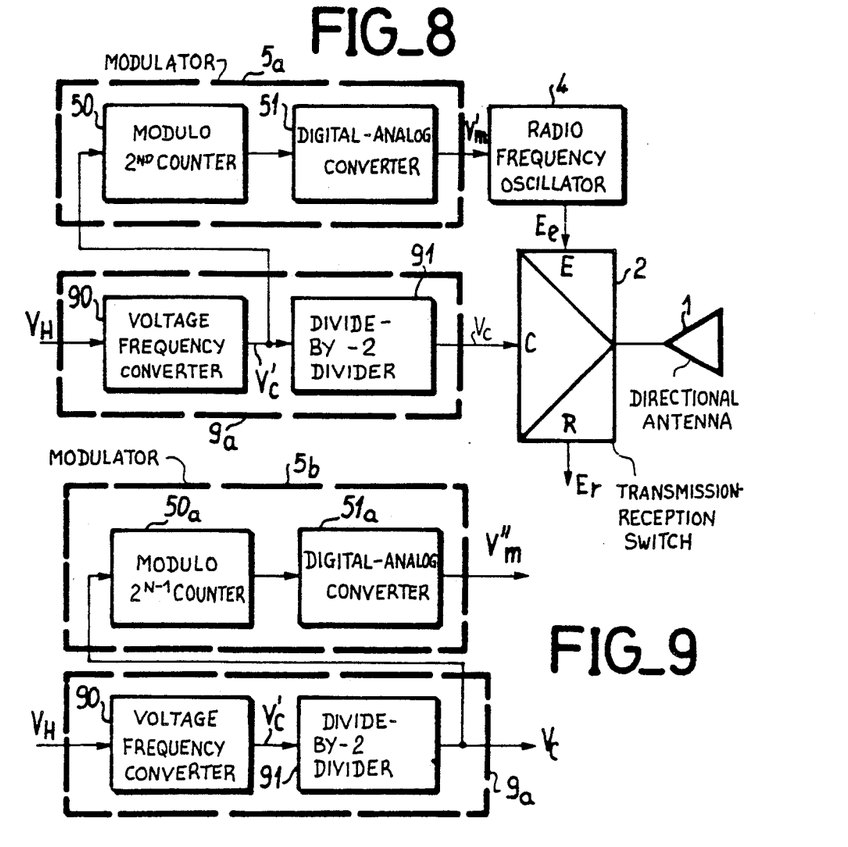
FIG. 8 is a block diagram showing one embodiment of the transmission modulator and of the generator of signals controlling the E/R switch.
FIG. 9 is a block diagram showing a variant of the transmission modulator.

FIG. 8 is a block diagram which shows one embodiment of the modulator of the transmitter and of the generator of signals controlling the E/R switch. The generator 9a of control signals Vc comprises a voltage/frequency converter (V/F) which receives the control signal $V_R$ which decreases with the altitude (H) and it elaborates a clock signal V'c whose recurrence period $T_R/2$ is proportional to the size of the control signal. The clock signal V'c is applied to a divide-by-2 divider circuit which delivers the control signal Vc for the E/R switch (2) whose form factor is equal to a half. The modulator 5a of the radio frequency oscillator 4 of the transmitter is constructed in digital form. This modulator 5a comprises a modulo $2^N$ counter 50 which is connected to a digital-analog converter (D/A) 51. The output signal V'm is applied to the frequency control input of the radio frequency oscillator 4.

Figure 10:
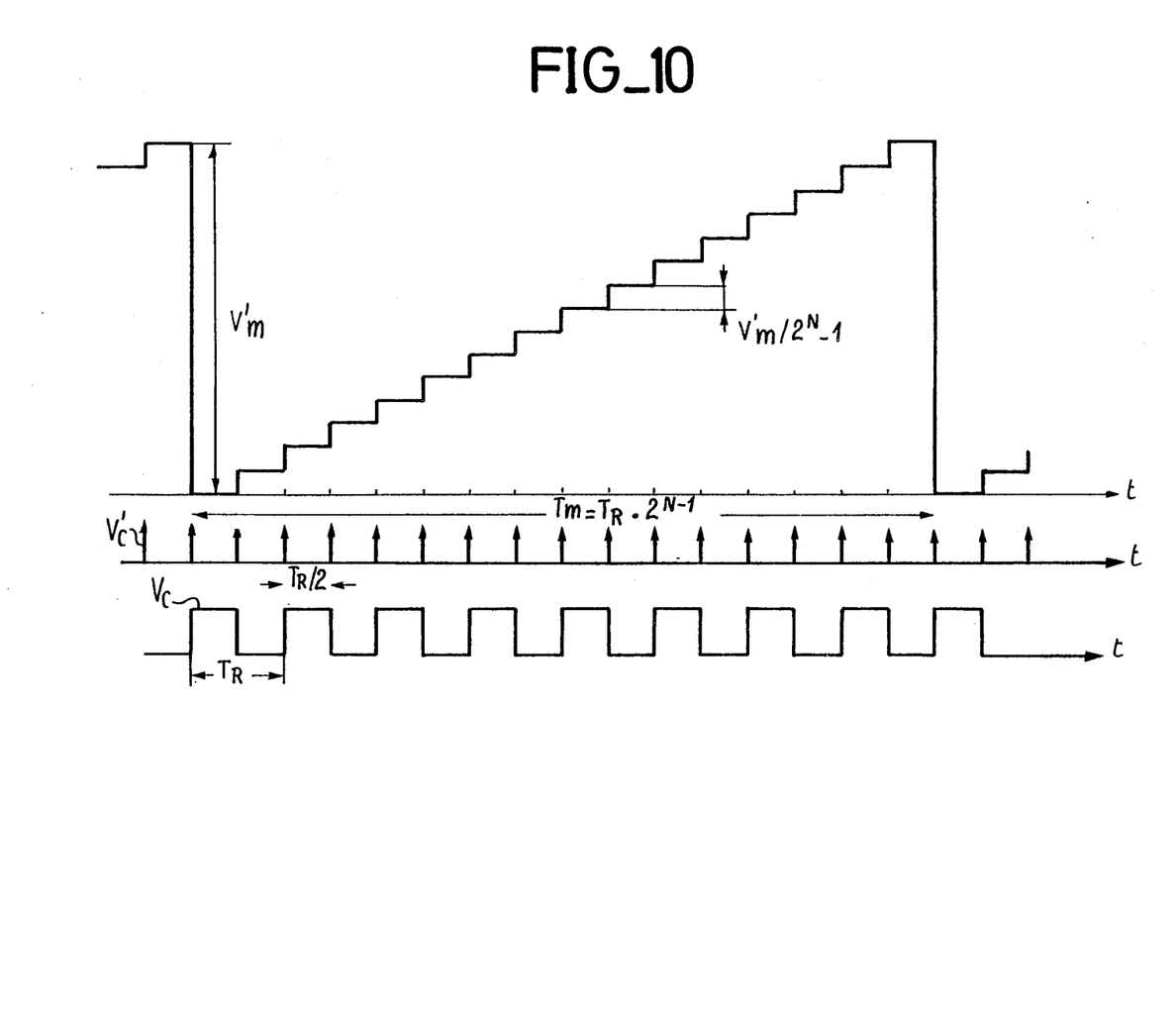
FIG. 10 relates to FIG. 8 and shows a timing diagram of the signals.

FIG. 10 is a timing diagram of the signals of the modulator 5a and of the signal generator 9a described in FIG. 8. The output signal V'c of the V/F converter is a clock signal with a recurrence period $T_R/2 = \tau = 2H/C$. The signal Vc controlling the E/R switch is a square signal with a recurrence period $T_R$ and, for example when this control signal is at the high level, the transmission signal Ec is transmitted to the antenna 1. The signal V'm for modulating the transmitter is a staircase signal with a recurrence period $Tm = 2^{(N-1)}$. $T_R$ and the jumps between steps have as value $\Delta V'm(2^N-1)$. It will be noted that the frequency jumps of the transmitter are equal and have for value the beat frequency fb.

FIG. 9 is a block diagram which shows a variant of the transmission modulator of FIG. 8. In this variant, the generator of signals Vc controlling the E/R switch is identical to the one described above. The transmission modulator 9b comprises a modulo $2^{N-1}$ counter 50a which is connected to the output of the divider 91 and a D/A converter 51a which delivers a modulation signal V"'m to the radio frequency oscillator 4 of the transmitter.

Figure 11:
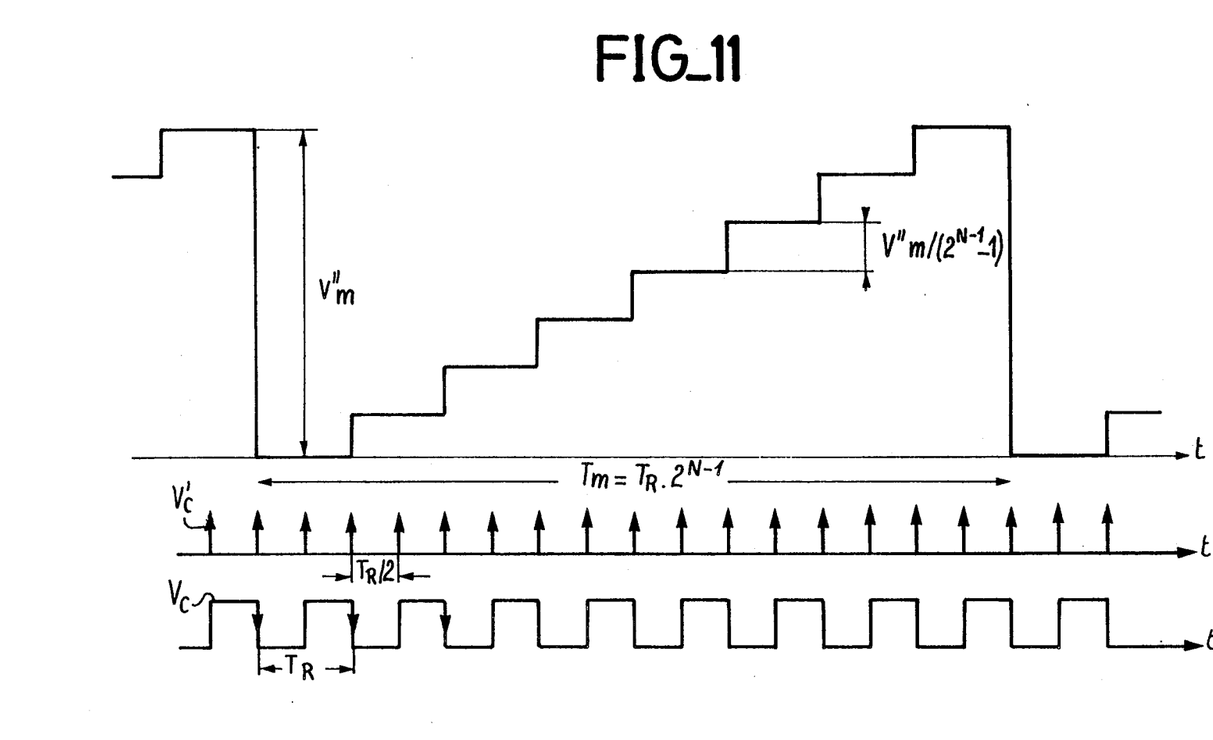
FIG. 11 relates to FIG. 9 and shows a timing diagram of the signals.

FIG. 11 is a timing diagram of the signals of modulator 5b, which are shown opposite the signals of the generator 9a generating signals Vc for controlling the E/R switch. The modulation signal V"m is a staircase signal with a recurrence period $Tm = 2^{(N-1)}.T_R$ and the level of each of the stairs is equal to $V"m/(2^{(N-1)}-1)$.

The invention is not limited in its characteristics by the particular embodiments of the elements which have been described by way of illustration which is no wise limitative. It is not limited by the numerical values of the constructional parameters, which must be adapted depending on the particular applications of the radio altimeter.

What is claimed is:

1. Frequency modulation, radio altimeter apparatus for use with a single antenna which emits transmission signals and receives echo signals, comprising:
   modulation means, having a control input, for providing periodic modulation signals having a recurrence period which is proportional to a delay time of said echo signal;
   radio frequency oscillator means, coupled to said modulation means, for providing said transmission signal modulated in accordance with said modulation signals;
   generator means, having a control input, for providing a periodic signal having a recurrence period which is proportional to said delay time of said echo signal;
   switch means, coupled to said oscillator means and said generator means and adapted to be coupled to said single antenna, adapted for switching said single antenna between a transmission mode and a reception mode, said switch means being controlled by said periodic signal from said generator means;
   RF mixer means, coupled to said switch means and to said oscillator means, for mixing said echo signals with said transmission signals to provide a mixed signal;
   RF bandpass amplifier means, coupled to said RF mixer means, for amplifying said mixed signal; and
   processing means, coupled to said bandpass amplifier means and to said modulation means and to said generator means, for acquiring and tracking said echo signals from the amplified mixed signal, and for supplying a control signal to the control inputs of said modulation means and said generator means, and for supplying an output signal corresponding to said delay time of said echo signal.

2. Apparatus according to claim 1, wherein said modulation means includes a saw tooth signal generator.

3. Apparatus according to claim 2 wherein said saw tooth generator includes a generator of analog signals.

4. Apparatus according to claim 2 wherein said saw tooth generator includes a digital generator having a pulse counter and a digital-to-analog converter coupled in series.

5. Frequency modulation, radio altimeter apparatus for use with a single antenna which emits transmission signals and receives echo signals, comprising:
   modulation means, having a control input, for providing periodic modulation signals having a recurrence period which is proportional to a delay time of said echo signal;
   radio frequency oscillator means, coupled to said modulation means, for providing said transmission signal modulated in accordance with said modulation signals;
   generator means, having a control input, for providing a periodic signal having a recurrence period which is proportional to said delay time of said echo signal;
   switch means, coupled to said oscillator means and said generator means and adapted to be coupled to said single antenna, adapted for switching said single antenna between a transmission mode and a reception mode, said switch means being controlled by said periodic signal from said generator means, and said switch means including:
   (i) a circulator adapted to be coupled to said single antenna, and having an input and an output;
   (ii) a first unidirectional isolator coupled to the input of said circulator;

(iii) a second unidirectional isolator coupled to the output of said circulator;

(iv) a first gate having a first input coupled to said oscillator means, a second input coupled to said generator means, and an output coupled to said first unidirectional isolator;

(v) an inverter having an input coupled to said generator means, and an output; and (vi) a second gate having a first input connected to the inverter output, a second input coupled to said second unidirectional isolator, and an output coupled to said mixer means;

RF mixer means, coupled to said switch means and to said oscillator means, for mixing said echo signals with said transmission signals to provide a mixed signal;

RF bandpass amplifier means, coupled to said RF mixer means, for amplifier means, coupled to said RF mixer means, for amplifying said mixed signal; and processing means, coupled to said bandpass amplifier means and to said modulation means and to said generator means for acquiring and tracking said echo signals from the amplified mixed signal, and for supplying a control signal to the control inputs of said modulation means and said generator means, and for supplying an output signal corresponding to said delay time of said echo signal.

6. Apparatus according to claim 5 wherein said first gate includes:
a first blocking element coupled to said generator means;
a capacitor coupled to said oscillator means and to said first blocking element;
a diode-impedance circuit coupled between ground and said capacitor;
a diode coupled between said first blocking element and said first unidirectional isolator; and
a second blocking element coupled between ground and said first unidirectional isolator.

7. Frequency modulation, radio altimeter apparatus for use with a single antenna which emits transmission signals and receives echo signals, comprising:
modulation means, having a control input, for providing periodic modulation signals having a recurrence period which is proportional to a delay time of said echo signal;
radio frequency oscillator means, coupled to said modulation means, for providing said transmission signal modulated in accordance with said modulation signals;
generator means, having a control input, for providing a periodic signal having a recurrence period which is proportional to said delay time of said echo signal;
switch means, coupled to said oscillator means and said generator means and adapted to be coupled to said single antenna, adapted for switching said single antenna between a transmission mode and a reception mode, said switch means being controlled by said periodic signal from said generator means, and said switch means including:
(i) first, second and third nodes, said second node being adapted to be coupled to said single antenna;
(ii) a first blocking element coupled between said generator means and said first node;

(iii) a first capacitor coupled between said oscillator means and said first node;
(iv) a first diode-impedance circuit coupled between ground and said first node;
(v) a first diode coupled between said first and second nodes;
(vi) a blocking element coupled between ground and said second node;
(vii) a second diode coupled between said second and third nodes;
(viii) a second blocking element coupled between said generator means and said third node;
(ix) a second capacitor coupled between said mixer means and said third node; and
(x) a second diode-impedance circuit coupled between ground and said third node;

RF mixer means, coupled to said switch means and to said oscillator means, for mixing said echo signals with said transmission signals to provide a mixed signal;

RF bandpass amplifier means, coupled to said RF mixer means, for amplifying said mixed signal; and processing means, coupled to said bandpass amplifier means and to said modulation means and to said generator means, for acquiring and tracking said echo signals from the amplified mixed signal, and for supplying a control signal to the control inputs of said modulation means and said generator means, and for supplying an output signal corresponding to said delay time of said echo signal.

8. Frequency modulation, radio altimeter apparatus for use with a single antenna which emits transmission signals and receives echo signals, comprising:
modulation means, having a control input, for providing periodic modulation signals having a recurrence period which is proportional to a delay time of said echo signal;
radio frequency oscillator means, coupled to said modulation means, for providing said transmission signal modulated in accordance with said modulation signals;
generator means, having a control input, for providing a periodic signal having a recurrence period which is proportional to said delay time of said echo signal;
RF mixer means, coupled to said switch means and to said oscillator means, for mixing said echo signals with said transmission signals to provide a mixed signal, said mixer means also being coupled to said generator means and including:
(i) an inverter having an input coupled to said generator means, and an output;
(ii) a preamplifier having an input coupled to said mixer means, and an output;
(iii) a gate coupled to the outputs of said inverter and said preamplifier, and having an output;
(iv) a bandpass filter coupled to the output of said gate, and having an output;
(v) an amplifier having an input coupled to the output of said bandpass filter;

RF bandpass amplifier means, coupled to said RF mixer means, for amplifying said mixed signal; and processing means, coupled to said bandpass amplifier means and to said modulation means and to said generator means, for acquiring and tracking said echo signals from the amplified mixed signal, and for supplying a control signal to the control inputs of said modulation means and said generator means, and for supplying an output signal corresponding to said delay time of said echo signal.

9. Frequency modulation, radio altimeter apparatus for use with a single antenna which emits transmission signals and receives echo signals, comprising:

modulation means, having a control input, for providing periodic modulation signals having a recurrence period which is proportional to a delay time of said echo signal;

radio frequency oscillator means, coupled to said modulation means, for providing said transmission signal modulated in accordance with said modulation signals;

generator means, having a control input, for providing a periodic signal having a recurrence period which is proportional to said delay time of said echo signal;

switch means, coupled to said oscillator means and said generator means and adapted to be coupled to said single antenna, adapted for switching said single antenna between a transmission mode and a reception mode, said switch means being controlled by said periodic signal from said generator means;

said generator means including:
  (i) a voltage frequency converter having an output; and
  (ii) a divide-by-two divider coupled to said voltage frequency converter output, an output of said divide-by-two divider being provided to said switch means;

said modulation means including:
  (i) a modulo $2^D$ counter coupled to said voltage frequency converter output; and
  (ii) a digital-to-analog converter coupled to an output of said modulo $2^D$ counter;

RF mixer means, coupled to said switch means and to said oscillator means, for mixing said echo signals with said transmission signals to provide a mixed signal;

RF bandpass amplifier means, coupled to said RF mixer means, for amplifying said mixed signal; and processing means, coupled to said bandpass amplifier means and to said modulation means and to said generator means, for acquiring and tracking said echo signals from the amplified mixed signal, and for supplying a control signal to the control inputs of said modulation means and said generator means, and for supplying an output signal corresponding to said delay time of said echo signal.

10. Frequency modulation, radio altimeter apparatus for use with a single antenna which emits transmission signals and receives echo signals, comprising:

modulation means, having a control input, for providing periodic modulation signals having a recurrence period which is proportional to a delay time of said echo signal;

radio frequency oscillator means, coupled to said modulation means, for providing said transmission signal modulated in accordance with said modulation signals;

generator means, having a control input, for providing a periodic signal having a recurrence period which is proportional to said delay time of said echo signal, said generator means including:
  (i) a voltage frequency converter having an output; and
  (ii) a divide-by-two divider coupler to said voltage frequency converter output, and having an output;

said modulation means including:
  (i) a modulo $2^{N-1}$ counter coupled to said divide-by-two divider output; and
  (ii) a digital-to-analog converter coupled to an output of said modulo $2^{N-1}$ counter;

switch means, coupled to said oscillator means and said generator means and adapted to be coupled to said single antenna; adapted for switching said single antenna between a transmission mode and a reception mode, said switch means being controlled by said periodic signal from said generator means;

RF mixer means, coupled to said switch means and to said oscillator means, for mixing said echo signals with said transmission signals to provide a mixed signal;

RF bandpass amplifier means, coupled to said RF mixer means, for amplifying said mixed signal; and processing means, coupled to said bandpass amplifier means and to said modulation means and to said switch means, for acquiring and tracking said echo signals from the amplified mixed signal, and for supplying a control signal to the control inputs of said modulation means and said generator means, and for supplying an output signal corresponding to said delay time of said echo signal.

* * * * *